United States Patent [19]

Sakakibara et al.

[11] Patent Number: 4,946,424
[45] Date of Patent: Aug. 7, 1990

[54] BELT DRIVEN CONTINUOUSLY VARIABLE TRANSMISSION

[75] Inventors: Shiro Sakakibara, Toyokawa; Masahiro Hasebe, Anjo; Masashi Hattori, Anjo; Shigekazu Ohara, Anjo, all of Japan

[73] Assignee: Aisin Aw Co., Ltd., Anjo, Japan

[21] Appl. No.: 343,286

[22] PCT Filed: Aug. 27, 1988

[86] PCT No.: PCT/JP88/00856
§ 371 Date: Apr. 26, 1989
§ 102(e) Date: Apr. 26, 1989

[87] PCT Pub. No.: WO89/02043
PCT Pub. Date: Mar. 9, 1989

[30] Foreign Application Priority Data

Aug. 28, 1987 [JP] Japan .................................. 62-214378
Aug. 27, 1988 [JP] Japan .................................. 63/00856

[51] Int. Cl.⁵ .................................................. F16H 11/02
[52] U.S. Cl. ........................................... 474/11; 474/17
[58] Field of Search ........................ 474/11, 12, 17–19, 474/28, 69, 70; 74/866–869

[56] References Cited

U.S. PATENT DOCUMENTS

4,403,974 9/1983 Sherman et al. ...................... 474/11
4,541,821 9/1985 Sakakibara ........................... 474/17
4,547,178 10/1985 Hayakawa et al. ................... 474/11

Primary Examiner—Thuy M. Bui
Attorney, Agent, or Firm—Kanesaka and Takeuchi

[57] ABSTRACT

This invention relates to a belt driven continuously variable transmission having a pressure regulating cam mechanism giving a pulley an axial force which corresponds to transmission torque and eliminates torque transmission by friction between a pressure regulating cam and a fixed race. The stationary sheave, whose outer surface is supported, with rotation free at a case, by a bearing and whose inner side encloses the pressure regulating cam mechanism, has a circular hub elongating axially to the back side of the stationary sheave. Therefore, torque from the engine is transmitted to the fixed race of the regulating cam mechanism through an input member, and further transmitted to the stationary sheave through a roller and a movable race of the regulating cam mechanism. Consequently, the stationary sheave is supported at the case by the bearing and the radial load does not work on the pressure regulating cam mechanism. Therefore, the axial force generated by the pressure regulating cam mechanism can be set to correspond to the torque from the engine side without getting any influence from the torque transmission by friction.

5 Claims, 4 Drawing Sheets

| ELEMENTS POSITION | | C1 | C2 | CL | B1 | B2 | F |
|---|---|---|---|---|---|---|---|
| P | | | | | | | |
| R | | | | | ○ | ○ | |
| N | | | | | | | |
| D | L | ○ | | ○* | | | ○ |
| | H | ○ | ○ | ○* | | | |
| S | L | ○ | | ○* | ○ | | ○ |
| | H | ○ | ○ | ○* | | | |

BELT DRIVEN CONTINUOUSLY VARIABLE TRANSMISSION

BACKGROUND OF THE INVENTION

1. Field of the Invention

This invention relates to a belt driven continuously variable transmission, especially relates to a belt driven continuously variable transmission suitable for using in an automatic variable transmission to be mounted on an automobile, in detail, relates to a pressure regulating mechanism section generating an axle force corresponding to a transmission torque.

2. Description of Prior Art

Generally, A V-Belt type continuously variable transmission (CVT) has a primary pulley and a secondary pulley each of which is made up of a movable sheave and a stationary sheave. Metallic belt is wound around both of these pulleys. A shifting operation is done at a required moment by moving the movable sheave with a hydraulic pressure piston.

Therefore, the continuously variable transmission, where a hydraulic pressure is used, needs an oil pump and a hydraulic pressure passage. This structure makes the device not only large and complicated but also unfavorable for the transmission efficiency and the belt endurance because the structure generates the pressing force more than needed, which furthermore, makes it impossible to transmit, as the belt pressing force becomes short in supply, when the hydraulic pressure decreases by some reasons.

Figure 5:
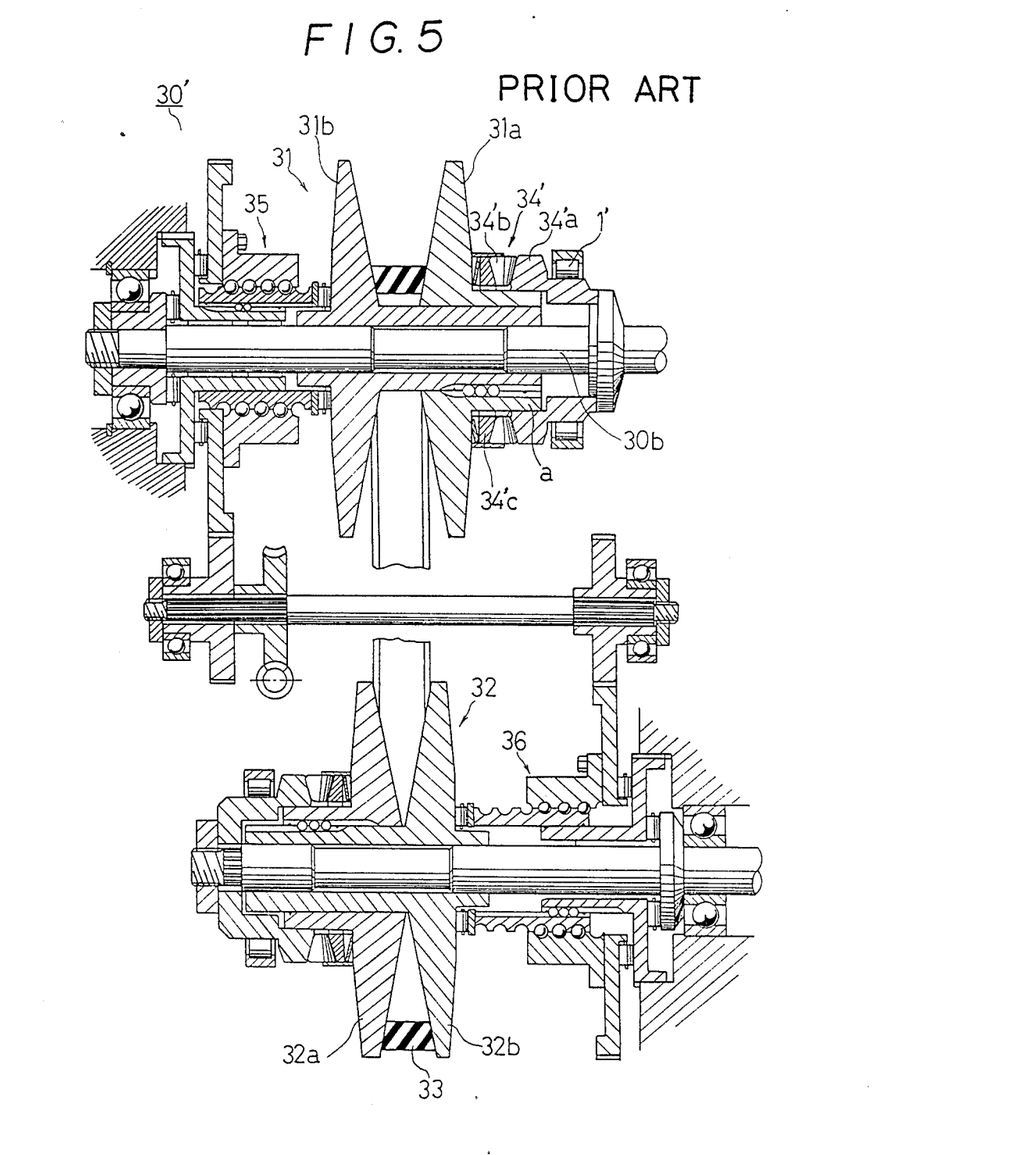
FIG. 5 is a cross sectional view of the prior art.

The applicant of the present invention has proposed a belt driven continuously variable transmission 30′, as shown in FIG. 5, to wind a metallic belt 33 around a primary pulley 31 and a secondary pulley 32, whose movable sheave 31b and 32b are moved axially by actuator mechanisms 35 and 36 such as ball thread mechanism, and to arrange a pressure regulating cam mechanism 34′ giving an axial force which corresponds to a transmission torque to a primary sheave 31a. (refer to the Japanese Laid Open Patent No.62-13853)

In the belt driven continuously variable transmission 30′, both the sheaves 31a and 31b of the primary pulley 31 are supported on the primary shaft 30b, the pressure regulating cam mechanism 34′ is supported on a boss section 'a' of a stationary sheave 31a and also supported on a case by a bearing 1′.

Therefore, in the continuously variable transmission 30′, a torque from the primary shaft 30b is transmitted to the stationary sheave 31a through the pressure regulating cam mechanism 34′ and also transmitted from the primary pulley 31 to the secondary pulley 32 through a belt 33. When the torque is transmitted form the pressure regulating cam mechanism 34′ to the stationary sheave 31b, not only a torque to be transmitted through the pressure regulating cam mechanism 34′, or a fixed-side race 34′a, a roller 34′b and a movable-side race 34′c, but also another torque to be transmitted directly by the friction of the fixed-side race 34′a and a stationary sheave 31a, is produced.

A torque made by the friction varies largely because the pulley 31 is supported through the pressure regulating cam mechanism 34′, so that the radial force between the sheave 31a and the boss section 'a' alters according to the belt tension. For example, generally, supporting the ratio of the whole torque to be transmitted is (ten), the ratio of a torque transmitted through the fixed-side race 34′a, a roller 34′b and a movable-side race 34′c (eight) and the ratio of a torque transmitted by the frictional force between the fixed-side race 34′a and the fixed-side sheave 31a (two), the ratio of the frictional force torque can be increased from (two) to around (five) by the variation of the belt tension. Therefore, the transmission torque through the pressure regulating cam mechanism 34′ also varies, so that the pressing force working on the belt 33 is made uneven. To overcome this unevenness requires a pressure regulating cam mechanism which generates a large axial force in order to keep a certain pressing force, which lowers the endurance and the transmission efficiency of the V-belt 33.

This invention is purposed to provide a belt driven continuously variable transmission which transmits whole torque through a regulating cam mechanism so that the belt pressing force which responds correctly to the transmission torque can be obtained.

SUMMARY OF THE INVENTION

Figure 1:
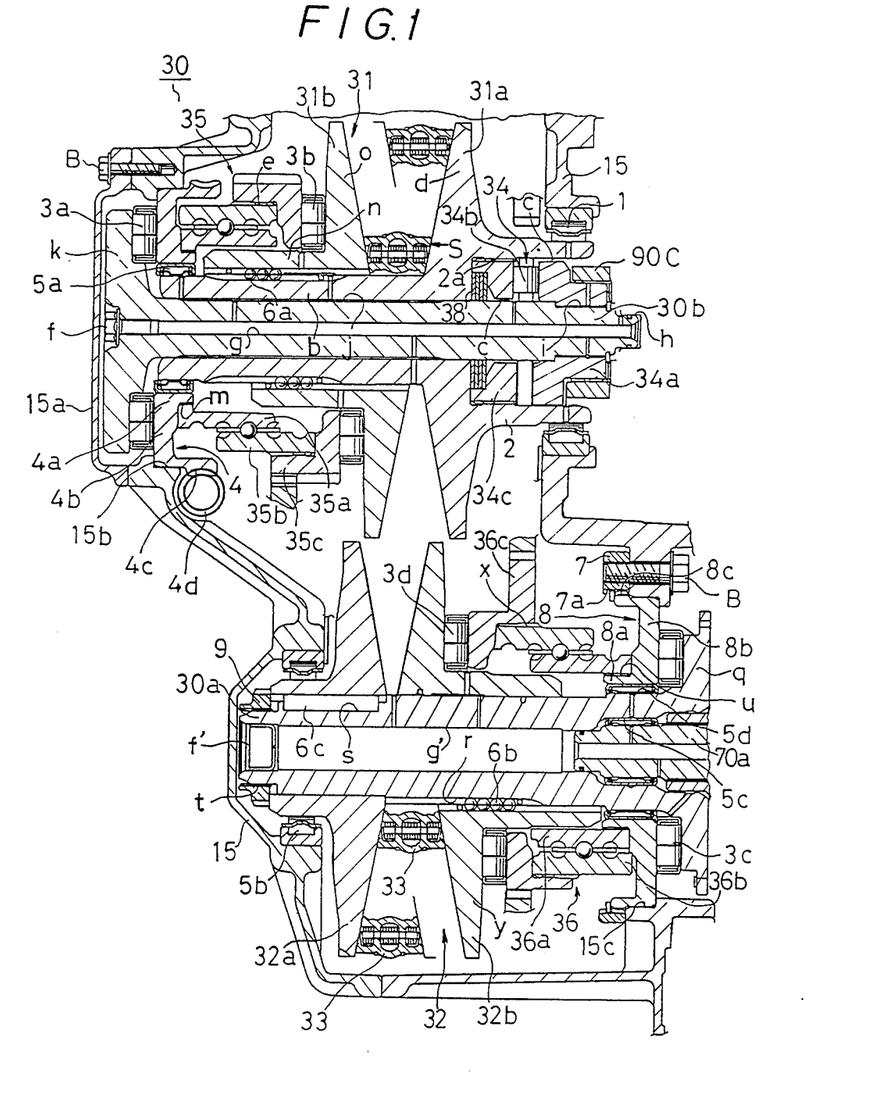
FIG. 1 is a cross sectional view of a belt driven continuously variable transmission relating to this invention.

This invention is proclaimed in order to solve above problems. For example, as shown in FIG. 1, this invention has a primary pulley (31) and a secondary pulley (32) both of which are supported respectively by a shaft (30b) and (30a), and both of which are composed of two sheaves (31a), (31b), (32a) and (32b), all relatively movable to the axial direction, and this invention is a belt driven continuously variable transmission (30) winding a belt (33) around the pulleys (31) and (32). This belt driven continuously variable transmission (30) has a pressure regulating mechanism (34), such as a cam mechanism, giving an axial force corresponding to the transmission torque to at least one of the pulleys (31) and (32), and also has actuator mechanisms (35) and (36) such as a ball thread mechanism moving movable sheaves (31b) and (32b) of both the pulleys axially.

The pressure regulating mechanism (34) is arranged right above the transmitting path of a sheave (31a) giving an axial force in order to eliminate the supporting relation to the radial direction of the sheave (31a) which is supported directly in the case (15) by a bearing (1) and (5a).

To put it concretely, the sleeve where the axial force is given has a circular hub (2) elongating axially from the back side of the sheave (31a). The outer surface of the hub (2) is supported with rotation free at the case (15) by the bearing (1) and the pressure regulating mechanism (34) is arranged in the inner surface of the hub (2).

With the above structure, the rotation of the input member (90C) is transmitted to the fixed side race (34a) of the pressure regulating mechanism (34) and the fixed sheave (31a) of the primary pulley (31) through the pressure regulating mechanism (34). At this process, the fixed sheave (31a) is supported to the case (15) by the bearing (1). As the radial force does not work on the pressure regulating mechanism (34), the whole torque of the input member (90C) is transmitted through the pressure regulating mechanism (34). So an axial force (S) corresponding to the transmission torque works on the sheave (31a) and holds the belt (33) with suitable force. And the torque transmitted to the primary pulley (31) is transmitted to the secondary pulley (32) through the belt (33) where the suitable force works.

As has been explained, by this invention, the whole transmission torque from the input member (90C) is transmitted to the pulley (31) through the pressure regulating mechanism (34), so the axial force (S) corresponding correctly to the transmission torque works on the pulley (31) and the adequate belt holding force can be obtained. The axial force generated at the pressure regulating mechanism (34) can be set small in order to correspond to the transmission torque, which can enhance the belt endurance and can improve the transmission efficiency. As the sheave (31a) is supported directly at the case (15) by the bearings (1) and (5a), the supporting precision of the pulley (31) is improved and the vibration and the noise of the belt (33) is reduced so that the reliability of the belt driven continuously variable transmission (30) can be ensured.

Incidentally, the reference numerals in the prentheses are used only for reference with the drawings and do not define the invention. The same number may be named differently in the following description and in the previous description in which broader concepts are adopted.

DETAILED DESCRIPTION OF THE PREFERRED EMBODIMENT

A detailed description of the preferred embodiments shall now be shown with the drawings.

Figure 2:
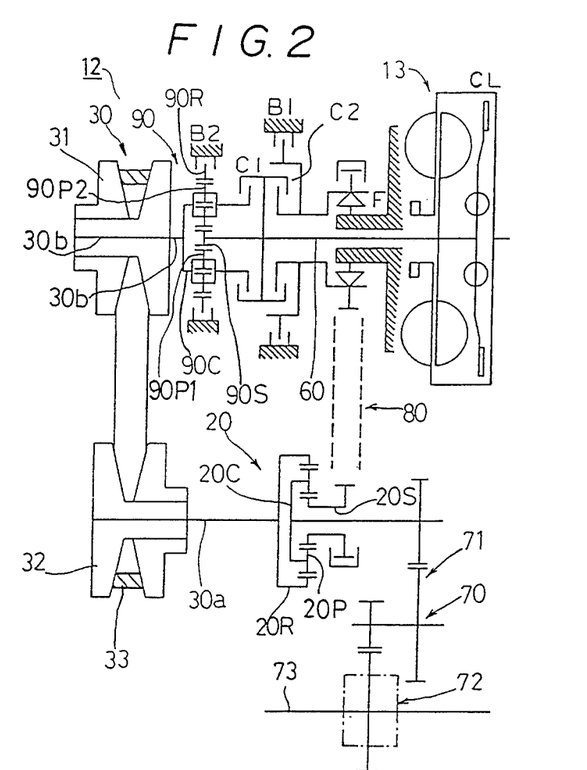
FIG. 2 is a schematic representation of a continuously variable transmission where this invention is applicable.

This automatic continuously variable transmission 12, as shown in FIG. 2, has a single planetary gear device 20, a belt driven continuously variable transmission 30, a transfer device 80, an input shaft 60, an output member 70 composed of a reduction gear device 71 and a differential device 72, a fluid coupling 13 having a lock-up clutch CL and a forward/reverse switching device 90 composed of a dual planetary gear device. And in the single planetary gear device 20, an element 20S (or 20R) are to be a reaction force supporting member when using the single planetary gear device 20 as a reduction mechanism, and the element 20S (or 20R) moves together with a restraining means F and B1 through a transfer device 80 and can connect/disconnect with the input shaft 60 through a high clutch C2.

To put it concretely, a ring gear 20R of the planetary gear device 20 moves together with a secondary shaft 30a of a continuously transmission 30, a carrier 20C moves together with the output member 70, and the sun gear 20S moves together with a low one-way clutch F and a low coast & reverse brake B1 both composing an engaging means through the transfer device 80 and also moves together with a high clutch C2.

In the dual planetary gear device 90, the sun gear 90S connects to and input shaft 60, the carrier 90c connects to both a primary shaft 30b of the continuously variable transmission 30 and an input shaft 60 through a forward clutch C1 and a ring gear 90R connects to a reverse brake B2.

Figure 3:
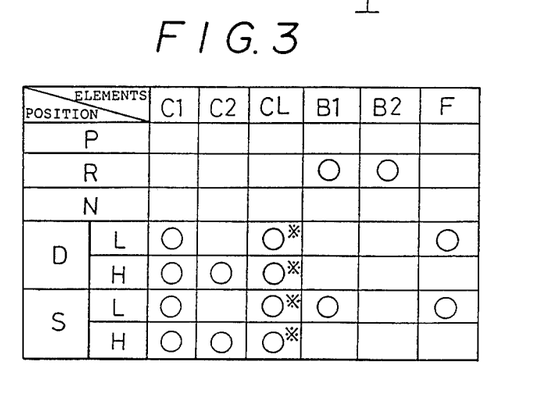
FIG. 3 is a table of the operation of each elements.

Based on the above structure, each clutches, brakes and one-way clutches within the automatic continuously variable transmission 12 operate as shown in FIG. 3. ※ shows that the lock-up clutch CL can move at a required moment.

In detail, at the low speed side L of D range, a forward clutch C1 connects and a low one-way clutch F operates. At this stage, the rotation of the engine crank shaft is transmitted to the input shaft 60 through the lock-up clutch CL or the fluid coupling 13, to the sun gear 90S of the dual planetary gear device 90 directly and to the carrier 90C through the forward clutch C1. Therefore, the dual planetary gear mechanism 90 rotates together with the input shaft 60, transmits the positive rotation to the primary shaft 30b of the belt driven continuously variable transmission 30. Furthermore, the rotation shifted at a required moment in the continuously variable transmission 30 is transmitted from the secondary shaft 30a to the ring gear 20R of the single planetary gear device 20. While, at this state, the sun gear 20S which is the reaction force supporting element to receive the reaction force is stopped by a low one-way clutch F through a transfer device 80. Therefore the rotation of the ring gear 20R is taken out from the carrier 20C as reducing rotation, and transmitted to the axle 73 through the reduction gear device 71 and the differential device 72.

At the high speed side H of D range, not only the forward clutch C1 but also a high clutch C2 connects. At this state, the positive rotation shifted at a required moment in the continuously variable transmission is taken out from the secondary shaft 30a and input into the ring gear 20R of the single planetary gear device 20. While, at the same time, the rotation of the input shaft 60 is transmitted to the sun gear 20S of the single planetary gear device 20 through the high clutch C2 and the transfer device 80. By this process, torque of the ring gear 20R and the sun gear 20S is combined and taken out from the carrier 20C. At this state, as the rotation against the reaction force through the transfer device 80 is transmitted to the sun gear 20S, the torque loop does not occur and the certain positive torque is transmitted through the transfer device 80. The combined torque from the carrier 20C is transmitted to the axle shaft 73 through the reduction gear device 71 and the differential device 72.

At the operation of D range, the rotation is free at the reverse torque operation (at the engine brake) based on the one-way clutch F, while at the operation of S range, besides the low one-way clutch F the low coast & reverse brake B1 operates and power can be transmitted even at the reverse operation.

At the R range; the reverse brake B2 operates together with the low coast & reverse brake B1. At this state, the rotation of the input shaft 60 is input to the belt driven continuously variable transmission 30 as a reverse rotation from the carrier 90C as the ring gear 90R is fixed at the dual planetary gear device 90. While, based on the operation of the low coast & reverse brake B1, the sun gear 20S of the single planetary gear device 20 is fixed so that the reverse rotation of the belt driven continuously variable transmission 30 is decelerated at the planetary gear device 20 and taken out to the output member 70.

And at P range and N range, the low coast & reverse brake B1 operates.

Figure 4:
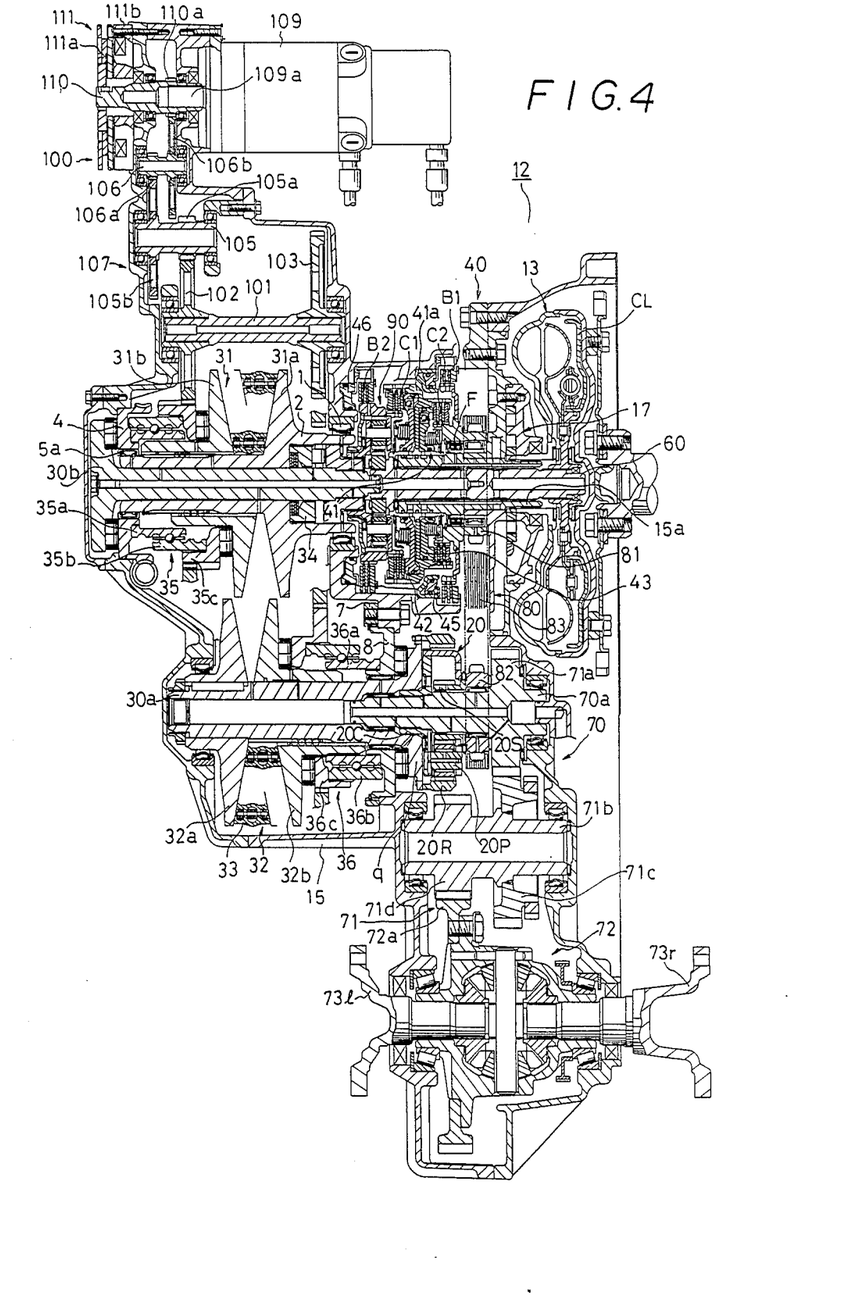
FIG. 4 is a cross sectional view of the contiguously variable transmission.

The embodiment of the automatic continuously variable transmission will be explained along with FIG. 4.

This continuously variable transmission 12 has a transmission case 15 where an input shaft 60 and a primary shaft 30b of the continuously variable transmission 30 are supported on the same shaft with rotation free and composes a first shaft. A secondary shaft 30a of the continuously variable transmission 30 and the gear shaft 70a are supported on the same shaft with rotation free and composes a secondary shaft. Furthermore, on the primary shaft, arranged, a fluid coupling 13 having a lock-up clutch CL, a forward clutch C1, a high clutch C2, a low coast & reverse brake B1, a reverse brake B2, a controlling section 40 having a low one-way clutch F, a dual planetary gear device 90 composing a forward-/reverse switching device and a hydraulic pressure pump 17. On the secondary shaft, a single planetary gear device 20 is arranged.

Furthermore, to explain the controlling section 40 and the input section, at the input shaft 60, whose one side edge engages with the lock-up clutch CL and the output member of the fluid coupling 13, and whose the other side edge engages with the sun gear 90S of the dual planetary gear device 90. On the input shaft 60 a sleeve section 15a which is fixed on the case 15 is arranged. To the sleeve section 15a, a sprocket 81 is connected through the one-way clutch F, while a sleeve shaft 41 connecting to the input shaft 60 is supported with rotation free. Furthermore, at one side of a flange section 41a extruding from the sleeve shaft 41, the forward clutch C1 is arranged together with a hydraulic actuator 42, and at the other side, a high clutch C2 is arranged together with a hydraulic actuator 43. The operated-side of the high clutch C2 is connected to the boss section of the sprocket 81, and the boss section 81 is connected to the low coast & reverse brake B1 arranged together with the hydraulic actuator 45 in the case 15. The operated-side of the forward clutch C1 is connected to the carrier 90C of the dual planetary gear device 90 whose ring gear 90R engages with the reverse brake B2 arranged in the case 15 together with the hydraulic actuator 46 (refer to FIG. 2). Here, the carrier 90C supports a pinion 90P1 engaging with the sun gear 90S and a pinion 90P2 engaging with the ring gear 90R, and the pinions 90P1 and 90P2 mesh with each other.

The single planetary gear device 20 is situated on the gear shaft (output shaft) 70a composing the secondary shaft, the ring gear 20R connects to the flange section 'q' integrally arranged on the primary shaft 30a of the belt driven continuously variable transmission 30 to be explained later on. On the gear shaft 70a, a sprocket 82 is supported with rotation free together with the sun gear 20S. On the gear shaft 70a, the carrier 20C supporting the pinion 20P with rotation free is spline-coupled.

While, between the sprocket 82 integrally composed with the sun gear 20S and the sprocket 81 supported by the low one-way clutch F, a silent chain 83 is set round and composes the transfer device 80 by these sprockets and the chain.

The gear shaft 70a composes the output member 70 integrally composing a gear 71a, which engages with a gear 71c fixed to an intermediate shaft 71b. Furthermore, on the intermediate shaft 71b, a small gear 71d is arranged. The small gear 71d engages with the ring gear 72a fixed on the differential device 72 and composes a reduction device 71. A right/left front axle shaft 73l and 73r elongate from the differential device 72.

The belt driven continuously variable transmission 30 related to this invention, as shown in FIG. 1, is arranged with a primary pulley 31, a secondary pulley 32 and a belt 33 set around both of these pulleys, which are made of stationary sheave 31a, 32a and movable sheave 31b, 32b.

The stationary sheave 31a of the primary pulley 31 encloses the primary shaft 30b and has a long boss section 'b' elongated to the side of the movable sheave 31b. A cylinder-shaped hub 2 is integrally composed on the back surface of the flange section 'd'. The outer diameter surface of the hub 2, whose inner diameter side has a pressure regulating cam mechanism 34 arranged, is supported by a case 15 with rotation free through a roller bearing 1.

The pressure regulating cam mechanism 34 is composed of a fixed race 34a and a movable race 34c, both of which have waveshaped edge surfaces and a roller 34b interposed between both edges. While, the fixed race 34a is spline-coupled with the edge of the primary shaft 30b and stopped by snap rings, etc. The movable race 34c connects to a spline 2a arranged on the inner diameter surface of the hub section 2 with axial direction movement free. Between the fixed race 34a and the inner diameter surface of the hub section 2 a certain interval 'c' is arranged. Between the movable race 34c and the primary shaft 30b a certain interval 'c' is also arranged. Therefore between the fixed race 34a and the stationary sheave 31a, and, the movable race 34c and the shaft 30b, no torque transmission by frictional contact occurs. On the outer diameter surface of the fixed race 34a where the carrier 90C, or the input member, of the dual planetary gear 90, a spline is arranged. The movable race 34c transmits the torque to the fixed sheave 31a through the spline 2a, and provides the axial force S which is in proportion to the transmitting torque through many disc springs 38 which are arranged in the concave section of the stationary sheave 31a, and the disc springs provide the preload.

While, an oil passage 'g' whose edge is pluged by a cap 'f' runs through right in the middle of the primary shaft 30b where many holes applying lubricating oil to required places are arranged. The edge of the dual planetary gear device 90 is an "in-low" section 'h' engaging with the input shaft 60. The outer diameter surface of the edge is a spline section 'i' and the section where engages with the boss section 'b' of the stationary sheave 31a is an oil groove 'j'. And one of the ends of the shaft 30b, which holds aloof from the gear device 90, enlarges to shape integrally a large diameter flange section 'k', whose circumferential side of the inner surface constitutes a retainer surface for a thrust bearing 3a. While, on the case 15 a cap 15a is fixed by a bolt B covering the large diameter flange 'k'. The shoulder section 15b of the case 15 supports the regulating retainer 4.

The regulating retainer 4 is made of circular member having channel shaped cross section. An inner diameter brim 4a supports the stationary sheave 31a with rotation free through the radial roller bearing 5a. A spline 'm' is arranged on the outer surface of the brim 4a. A thrust bearing 3a is supported by the outside of the side wall section 4b. An worm wheel 4c is arranged on the outer brim section of the regulating retainer. This worm wheel 4c has a worm 4d engaged and rotates the regulating retainer 4. By rotating the worm 4d, the regulating retainer 4 rotates at an unvariable position in axial direction with touching the bearing 3a.

While, at the movable sheave 31b the boss section 'n' is supported by the boss section 'b' of the stationary sheave 31a with only sliding movement free through the ball spline 6a, and a ball thread device 35 is arranged on the back section of the flange section 'o'. The ball thread device 35 is made of a bolt section 35a and a nut section 35b. On the inner surface of the bolt section 35a, a groove to engage with the spline 'm' of the regulating retainer 4 is arranged. On the outer diameter surface of the nut section 35b a spline 'e' is arranged. A circular gear section 35c whose outer diameter section has a spiral-circular gear is spline-coupled to the outer diameter surface of the nut section 35b. Between the gear section 35c and the flange section 'o' of the movable sheave 31b, a thrust bearing 3b is arranged. Therefore, a bolt section 35a of a ball thread device 35 is connected to the case 15, without rotation free, through the regulating retainer 4, and the section 35a is connected to the primary shaft 30b, without axial move, through the thrust bearing 3a. The nut section 35b of the ball thread device 35 is connected to the movable sheave 31b with being axially movable through the thrust bearing 3b.

While, the secondary pulley 32 has a stationary sheave 32a and a movable sheave 32b. The stationary sheave 32a is supported in the case 15, with rotation free, through a roller bearing 5b, and the sheave 32a is connected to a secondary shaft 30b, without rotation, through a key 6c. The movable sheave 32b is supported, with only axial movement allowed, by the secondary shaft 30a through a ball spline 6b.

The oil passage g' is running through the middle of the secondary shaft 30a and has the edge plugged by a cap f'. Many side holes to supply lubricating oil to required places are also arranged at the secondary shaft 30a, whose end section namely the side of the single planetary gear device 20 enlarges to be a large diameter flange section 'q'. The diameter of the oil passage g' becomes stair-shapedlly large, corresponding to the flange section q'. The stair-shapedlly enlarged section encloses the output shaft 70a through a needle bearing 5c. On the surface of the shaft 30a, starting from the large diameter flange section 'q', a ball groove 'r', a key groove 's' and a thread 't' are arranged and each groove supports the movable sheaeve 32b and the stationary sheaeve 32a, and a nut member 9 is screwed to the thread 't'

A regulating ring 7 is fixed by a bolt B on the approxiamately same vertical plane with the bearing 5c of the case 15. Furthermore, a regulating retainer 8 is directly supported by a shoulder section made in the case 15. The regulating retainer 8 whose cross section is channel shape is made of a circular member. An inner brim section 8a of the retainer 8 supports the secondary shaft 30a with rotation free through the roller bearing 5d, and outer diameter surface of the brim 8a arranges a spline 'u'. Furthermore, between the outside of a side wall section 8b and the flange 'q', a thrust bearing 3c is held. The circumference of the retainer 8 has threads 8c to engage with the thread 7a of the ring 7.

Furthermore, on the back side surface of a flange section 'y' of the movable sheaeve 32b, a ball thread device 36 which is composed of a bolt section 36a and a nut section 36b is arranged. A groove to mate with the spline 'u' of the regulating retainer 8 is arranged on a part of the inner side of the bolt section 36a. The outer surface of the nut section 36b has a spline 'x'. A noncircular gear section 36c where a non-circular gear is formed on the circumference is coupled to the spline 'x'. Between the gear section 36c and the flange section 'y', a thrust bearing 3d is disposed. Therefore the bolt section 36a of the ball thread device 36 is connected to the case 15 without rotation through the ring 7 and the retainer 8, and the bolt section 36a is also connected to the flange 'q' without axial move through the thrust bearing 3c. The nut section 36b is connected to the movable sheaeve 32b through the thrust bearing 3d so that the nut section 36b moves axially.

A shifting device 100 regulating the distance between the primary pulley 31 and the secondary pulley 32 is disposed between two pulleys 31 and 32 so that the device 100, the primary shaft 30b and the secondary shaft 30a become apexes of triangle in cross sectional view. The shifting device 100, as shown in FIG. 4, has an operating shaft 101 supported by the case 15 with rotation free. As FIG. 4 is an exploded view, the operating shaft 101 is drawn at the upper part, however, practically, the operating shaft 101 is placed between the primary shaft 30b and the secondary shaft 30a when seen from the same position where FIG. 4 is depicted. At the operating shaft 101, a circular gear 102 and a non-circular gear 103 are fixed. The circular gear 102 engages with a circular gear 35c fixed to the nut section 35b at the side of the primary pulley 31. The non-circular gear 103 engages with the non-circular gear 36c fixed to the nut section 36b at the side of the secondary pulley 32. The circular gear 102 meshes with a small gear 105a made of a spur gear or a herical gear formed on the intermediate shaft 105 which is disposed at opposite side of the circular gear 35c. A large gear 105b is formed on the intermediate shaft 105, the gear 105b meshes with a small gear 106a formed on an intermediate shaft 106. These gears compose a reduction device 107 which has a good efficiency of transmission. A comparatively small electric motor (or a supersonic motor) 109 is disposed with its one side coming out from the case 15. On an output shaft 109a of the motor 109, a shaft 110 having a small diameter gear 110a which engages to the large diameter gear 106b formed on the intermediate shaft 106 is fixed. A brake disc 111a is fixed on the shaft 110. An electromagnetic coil member 111b is fixed by a bolt at the case 15. The electromagnetic coil member 111b and the brake disc 111a compose an electromagnetic brake 111 which keeps the operating shaft 101 at suspending condition. As the supersonic motor has a supporting mechanism inside, when it is used, no special supporting mechanism such as the electromagnetic brake is required.

A assembly of the belt driven continuously variable transmission 30 shall be explained in detail.

At the primary side, the thrust bearing 3a is arranged on the primary shaft 30b and the stationary sheave 31a, the movable sheaeve 31b, the thrust bearing 3b and a ball thread device 35 both of which are in assembled manner, and a regulating retainer 4, are assembled on the shaft 30b. Then a disc spring 38, the movable race 34c and the roller 34b are enclosed in the hub section 2 and the fixed race 34a is screwed to the thread 'i' and stopped, which completes the whole assembly. At the secondary side, from the thread 't' side, the thrust bearing 3c, the regulating retainer 8, the ball thread device 36, the movable sheave 32b and the stationary sheave 32a, are assembled in this order. The nut member 9 is screwed to the thread 't', which completes the whole assembly.

A sub assembly at the primary side, composed as the above explanation, arranges a belt 33 between both the sheaves 31a and 31b, inserts a hug 2 of the stationary sheave into a roller bearing 1 and inserts the regulating retainer 4 into the shoulder 15b of the case 15 which is separatable into two parts. A sub assembley at the secondary side, whose regulating retainer 8 is interposed in the shoulder of the case 15, whose boss section of the movable sheave 32b is interposed in the roller bearing 5b, is arranged in the two-separable case 15.

At this state, by the tolerances among each member the initial belt tension is not correct, and the stroke at the transmission torque reversal of the regulating cam mechanism is big. So at the secondary side, the regulating retainer 8 is rotated by required amount, the bolt section 36a integral with the retainer 8 is rotated against the nut section 36b and the distance of the pulley 32 is regulated. Then, the gear 7a of the regulating ring 7 meshes with the gear 8c of the retainer 8 and the ring 7 is fixed by the bolt B. While, at the primary side, an warm 4d is rotated to rotate the regulating retainer 4. The bolt section 35a rotates together with the retainer 4. As the bolt section 35a is set axially by the thrust bearing 3a, the nut section 35b moves axially to regulate the distance of the pulley 31 correctly. By this process, the initial belt tension is regulated to make the stroke of the pressure regulating cam mechanism 34 correct and the axial position of both pulleys 31 and 32, namely, the belt driving line is regulated to be correct.

If an warm 4d is operated from outside the case 15, regulating operation can be done even after the case is composed. And the warm 4d can be arranged at the secondary side or at both the secondary side and the primary side. The regulating retainer can be arranged only either the primary or the secondary side.

The operation of this embodiment shall be explained below.

The rotation of the engine crank shaft is transmitted to the input shaft 60 through the lick-up clutch CL or the fluid coupling 13 and then transmitted to the sun gear 90S of the dual planetary gear device 90 and to the sleeve shaft 41. At the D range and the S range, the forward clutch C1 connects and the reverse brake B2 releases, so that at the dual planetary gear device 90, the sun gear 90S and the carrier 90C rotate together and the positive rotation is transmitted from the carrier 90C to the fixed race 34a of the pressure regulating cam mechanism 34 at the belt driven continuously variable transmission 30.

The rotation of the fixed race 34a rotates the primary shaft 30b engaging with the thread 'i' and also rotates the stationary sheave 31a of the primary pulley 31 through the roller 34b arranged on the wave-shaped surface, the movable race 34c and the spline 2a and furthermore rotates the movable sheave 31b through the ball spline 6a. At this state, the both sides of the stationary sheave 31a are supported by the case 15 through the bearing 1 and 5a. As the interval 'c' is made between the fixed race 34a and the section 2 and also between the movable race 34c and the primary shaft 30b, the torque is not transmitted from the fixed race 34a and from the primary shaft 30b to the stationary sheave 31a by the friction. The whole torque transmitted from the carrier (the input member) 90C is transmitted to the stationary sheave 31a through the pressure regulating cam mechanism 34. And at the pressure regulating cam mechanism 34, the axial force corresponding to the input torque which operates on the fixed race 34a operates on the back surface of the sheave 31a through the disc springs 38. While, at the other sheeve 31b, the ball thread mechanism 35 is fixed in axial direction to correspond to a certain shift ratio, therefore the reaction force having as same strength as that of worked on the backside of the sheave 31a through the thrust bearing 3b. By this process, the primary pulley 31 holds the belt 33 by the holding force corresponding to the input torque. The axial force S working on the movable sheave 31b works on the large diameter flange section 'k' of the primary shaft 31b through the thrust bearing 3b, the ball thread device 35, the regulating retainer 4 and the thrust bearing 3a. The axial force S working on the stationary sheave 31a works from the fixed race 34a to the shaft 30b through the thread 'i'. So the axial force S is kept inside the shaft 30b as a tension force. Furthermore, the rotation of the belt 33 is transmitted to the secondary pulley 32, then to the secondary shaft 30a through the key 6c and the ball spline 6b.

At the belt transmission, the motor 109 is controlled based on the signals from each sensors such as the opening ratio of the throttle and the vehicle speed. The operating shaft 101 is rotated through the reduction device 107. Then the nut section 35b of the ball thread device 35 at the side of the primary pulley 31 is rotated through the circular gears 102 and 35c. The nut section 36b of the ball thread device 36 at the side of the secondary pulley 32 is rotated through the non-circular gears 103 and 36c. By this process, the nut sections 35b and 36b rotate relatively between the bolt section 35a and 36a which are fixed on the case 15 by the regulating retainer 4 and 8. The ball thread devices 35 and 36 move the movable sheaves 31b and 32b through the thrust bearings 3b and 3d and the primary pulley 31 and the secondary pulley 32 are set with certain effective diameter, and the predetermined torque ratio can be obtained. The electric currency is cut, when the torque ratio reaches the predetermined level, and the electromagnetic brake 111 starts operating and keeps both the pulleys 31 and 32 at the same torque ratio. At this state, both the ball thread devices move linearly. Therefore the difference of traveling distances between the movable sheaves originally predetermined by the belt 33 and the the ball thread mechanisms arises, however, the side of the secondary pulley 32 rotates through non-circular gears 103 and 36c, the movable sheaves are moved according to the original distance of traveling. The belt holding force by both the sheaves 31a, 31b and 32a, 32b works, at the primary 31 side, to pull the primary shaft 30b through the thrust bearing without working on the case 15. At the secondary pulley 32 side, the belt holding force working to pull the secondary shaft 30a without working on the case 15.

Furthermore, the rotation of the secondary shaft 30a of the belt driven continuously variable transmission 30 is transmitted to the ring gear 20R of the single planetary gear device and also to the gear shaft 70a through the carrier 20C.

And at the low-speed side L of D range, as shown in FIG. 3, as the low one-way clutch F is in operating condition, a sun gear 20S receives the reaction force when the torque transmission from the ring gear 20R to the carrier 20C. The rotation of this sun gear 20S is stopped by the low one-way clutch F through a transfer device 80. The single planetary gear device 20 composes and serves as reduction mechanism. Therefore, the rotation of the secondary shaft 30a of the belt driven continuously variable transmission 30 is only reduced first at the single planetary gear device 20 then through a reduction gear device 71 having the gear 71a, 71c, the middle shaft 71b, the gear 71d and the mount gear 72a and finally transmitted to right and left front axle shaft 73l and 73r through the differential device 72.

When the opening ratio and the vehicle speed reach certain levels, a high clutch C2 receives signals from the controlling unit in order to connect and get switched to the high-speed side. The rotation of the input shaft 60 is first transmitted to the belt driven continuously variable transmission 30, then through the sleeve shaft 41 and the high clutch C2 transmitted to the sprocket 81 and finally to the sun gear 20S of the single planetary gear device 20 through the silent chain 83 and the sprocket 82. In this process, as the sprocket 81 at the input side of the transfer device 80 receives the reaction force from the sun gear 20S of the single planetary gear device by the low one-way clutch F, a shift-shock caused by the gear changes is prevented, the rotation starts smoothly by the connection of the high clutch C2 and the torque is transmitted to the sun gear 20S. By this process, the torque continuously transmitted by the belt driven continuously variable transmission and the torque through the transfer device 80 are combined at the single planetary gear device 20 and the combined torque is transmitted from the carrier 20C to the gear shaft 70a. Furthermore, as the same as the low-speed side, the combined torque is transmitted to the right and left front axle shafts 73l and 73r through the reduction gear device 71 and the differential device 72.

As the low-speed side L of S range receives a negative torque made by the engine brake and so on, the low-coast & reverse brake B1 engages and both the forward and the reverse rotations of the sprocket 81 is stopped. The condition of the high-speed side H at S range is as the same with that of the high-speed side of D range.

While, at the R range, the forward clutch C1 is released and the reverse brake B2 is engaged. Therefore, the rotation of the input shaft 60 transmitted to the sun gear 90S of the dual planetary gear device 90 is transmitted as a reverse rotation, due to the suspension of the ring gear 90R, from the carrier 90C to the primary shaft 30b of the belt driven continuously variable transmission 30. At this process, the reaction torque from the sun gear 20S through the transfer device 80 works on the sprocket 81 as the reverse rotation, the low-coast & reverse brake B1 operates and the sprocket 81 is stopped.

FEASIBILITY OF THE RELATED INDUSTRIES

As has been explained up to now, the belt driven continuously variable transmission having a pressure regulating mechanism giving a shaft force corresponding to the transmission torque relating to this invention can be used in any power transmitting device for transportation uses and industrial uses, and especially best used in automatic continuously variable transmission carried on automobiles.

We claim:

1. A belt driven continuously variable transmission including a primary pulley and a secondary pulley both of which being made of two relatively slidable sheaves being supported by shafts, a pressure regulating mechanism giving an axial force according to the transmission torque to at least one of said pulleys, an actuator mechanism to move movable sheaves of both pulleys axially, a belt wound around both pulleys, improvement comprising;
    said pressure regulating mechanism which is situated right in front of a power transmission path led to a sheave imparting axial force so that said sheave and said pressure regulating mechanism have no radial interconnection of supporting,
    said sheave imparting axial force which is directly supported on a case through a bearing.

2. A belt driven continuously variable transmission defined in claim 1, wherein a sheave which axial force is given has a tubular hub section elongated toward axial direction, and outer side of said hub section is supported by a bearing, and said pressure regulating mechanism is situated in inner side of said hub section.

3. A belt driven continuously variable transmission defined in claim 1, wherein said sheave is a stationary sheave of said primary pulley.

4. A belt driven continuously variable transmission defined in claim 1, wherein said pressure regulating mechanism is a pressure regulating cam mechanism which has an wave-shaped end surface and generates axial force by either positive or negative torque transmission.

5. A belt driven continuously variable transmission of defined in claim 1, wherein said belt driven continuously variable transmission which is used for an automatic continuous variable transmission where connecting a secondary shaft of said belt driven continuously variable transmission to a first rotating element of a planetary gear device; connecting a third rotating element of said planetary gear device, through a clutch, to an input shaft transmitting power to a primary shaft of said continuously variable transmission; furthermore connecting a second rotating element of said planetary gear device to an output section; whereby power transmission is conducted exclusively through said belt driven continuously variable transmission under the condition that said planetary gear device works as a reduction mechanism by releasing said clutch and restraining said third rotating element; by engaging said clutch, said planetary gear mechanism works as a split drive mechanism to combine torque transmitted through said belt driven continuously variable transmission and torque transmitted from said input shaft to said third rotating element.

* * * * *